United States Patent
Malfroy et al.

[11] Patent Number: 5,975,693
[45] Date of Patent: Nov. 2, 1999

[54] RESILENT HINGE FOR SPECTACLES FRAME UTILIZING A KNUCKLE WHICH INCLUDES RECESSED PORTIONS TO DEFINE TWO POSITIONS OF A SIDE-ARM

[75] Inventors: Roger Malfroy, Morez; Gilles Papillard, Monnet-la-Ville, both of France

[73] Assignee: Chevassus S.A., Morez, France

[21] Appl. No.: 08/994,006

[22] Filed: Dec. 18, 1997

Related U.S. Application Data

[63] Continuation of application No. PCT/IB96/00570, Jun. 10, 1996.

[30] Foreign Application Priority Data

Jun. 20, 1995 [FR] France ................................. 95 07614

[51] Int. Cl.⁶ ........................................................ G02C 5/22
[52] U.S. Cl. ............................................. 351/153; 16/228
[58] Field of Search .................................. 351/153, 111, 351/113, 119, 121; 16/228

[56] References Cited

U.S. PATENT DOCUMENTS 2,624,907  1/1953  Graham ................................. 361/153

5,589,895  12/1996  Mizuno ................................. 351/153

FOREIGN PATENT DOCUMENTS

| 0 207 190 | 1/1987 | European Pat. Off. . |
| 0 596 265 | 5/1994 | European Pat. Off. . |
| 0656 557 | 6/1995 | European Pat. Off. . |
| 2 057 408 | 5/1971 | France . |
| 2 111 136 | 6/1972 | France . |
| 2 542 099 | 9/1984 | France . |
| 43 06 502 | 9/1994 | Germany . |

*Primary Examiner*—Huy Mai
*Attorney, Agent, or Firm*—Henderson & Sturm

[57] ABSTRACT

The present invention relates to a resilient hinge which includes a front knuckle fixed to a front lug and an arm knuckle fixed to an arm. The two knuckles are connected by a hinge pin and have two contacting faces perpendicular to the hinge pin. The contacting face of one of the two knuckles has at least one raised portion with an oblique side interacting with one or more recessed portions of the contacting face of the other knuckle. The knuckles move in relation to each other along the connecting hinge pin and against the force exerted by a resilient device coaxial with the hinge pin when the raised portion leaves the recessed portions in the event of the arm rotating with respect to the front lug.

20 Claims, 8 Drawing Sheets

RESILENT HINGE FOR SPECTACLES FRAME UTILIZING A KNUCKLE WHICH INCLUDES RECESSED PORTIONS TO DEFINE TWO POSITIONS OF A SIDE-ARM

CROSS-REFERENCE TO RELATED APPLICATIONS

This is a continuation of PCT application Ser. No. PCT/IB96/00570, filed on Jun. 10, 1996, entitled SPECTACLES FRAME WITH A RESILIENT HINGE, the disclosure of which in its entirety is incorporated by reference thereto herein.

STATEMENT REGARDING FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention concerns a spectacle frame having a substantially vertical front when placed on the head of the user, and connected at either side by a hinge to a horizontal side arm for hooking the frame over the ears.

2. Definition of Related Art

A so-called "resilient" hinge allows the arm to move by rotation under tension in a substantially horizontal plane from one so-called "closed" position where this arm is practically parallel to the front, the frame being ready for insertion in a pocket or in a case, to a so-called "open" position where the arm is practically at right angles, the frame being ready to wear. This hinge may also provide a complementary resilient movement of the arm outwards beyond its open position. Such hinges then provide an element of comfort in the wearing of spectacles which is much appreciated by the public, in particular on account of the fact that the arms lie against the temples with a reasonable amount of pressure.

A hinge generally consists on the one hand of a front knuckle fixed to a front side lug, which lug may be straight, overlapping, rolled or elbowed; and on the other hand by an arm knuckle connected directly or indirectly to the end of the arm, a hinge pin providing a connection between the knuckles. The term female knuckle is used to designate a part comprising two eyeholes one above the other in the manner of a fork, and receiving in the middle the single eyehole of a male knuckle.

In a first type of resilient hinge, the periphery of the male knuckle has a cam shape, in particular having two notches defining the open and closed positions respectively, a cam against which a ball is pressed by a spring, both being installed in a housing provided opposite each other in the female knuckle. These complex hinges are described for example in documents FR 1 120 399 or EP 0 137 885.

In a second type of resilient hinge, capable of turning beyond the open position, the arm knuckle is connected to the arm in a telescopic manner by a complex resilient return mechanism, and the end of this arm rests against the lug situated in its alignment. Thus, when the arm moves beyond its open position, the inner edge of the end of the arm moves away from the fixed knuckle in a sort of rotation about the pivot point, a movement which compresses or extends the spring of the return mechanism. Conversely, when the arm returns towards its closed position, the cam-shaped periphery of the front knuckle pushes back the cap of the housing of the mechanism, which once more compresses or extends the spring. Such complicated hinges are for example described in the documents FR 1 511 263 or FR 2 609 816.

The document FR 2 057 408 describes another type of resilient hinge having a male front knuckle and a female arm knuckle connected by a hinge pin. The upper face of the male knuckle in contact with the upper eyehole of the female knuckle is flat, whereas the lower face is formed of a cruciform notch (or double hollow) interacting with a raised portion (or boss) with an oblique side on the lower eyehole of the female knuckle. This lower eyehole is flexible towards the bottom so as to move away when the arm is opened, the male knuckle remaining at a point in contact with the upper eyehole enclosed in the arm. The resilience of this hinge based on the flexing of all of a lower eyehole proves however too slack with time to be reliable.

The main disadvantage of these resilient hinges lies above all in the fact that the initial part of the lug and/or the arm outside its respective knuckle is of necessity bulky in order to house the resilient mechanism. The appearance of this is not particularly aesthetic, especially when the main part of the lug or the arm is reduced to a simple rod.

BRIEF SUMMARY OF THE INVENTION

The present invention concerns a resilient hinge for a spectacle frame which can be attached directly to a lug or an arm without modifying the ends of these parts, on account in particular of the fact that the resilient mechanism is contained in the hinge. These hinges should however remain robust, reasonably discrete, easy to manipulate and of moderate cost, by virtue in particular of a reduced number of their constituent parts.

These objects are achieved in a hinge comprising a front knuckle and an arm knuckle connected by a hinge pin, of which one of their contacting faces perpendicular to the hinge pin has at least one raised portion with an oblique side interacting with one or more hollows on the other, on account of the fact that these knuckles can move in relation to each other along the connecting hinge pin against the force exerted by a resilient device coaxial with the hinge pin when the raised portion leaves the hollow in the event of the arm rotating with respect to the lug.

Logically, it was unthinkable to position a "floating" male knuckle in a female knuckle against a spring coaxial with the hinge pin, since this spring is usually positioned aligned with the arm. However, after many workshop tests, it was found that this arrangement was nevertheless possible if a small spring was used having only two or three turns but of which the wire diameter was sufficient to provide a certain degree of stiffness, or if a spring was used in the form of a helical spiral or other arrangement according to the invention. On the other hand, this movement of the knuckle makes it possible to consider a higher raised portion for a better clicking effect. This also enables the resilient mechanism to be incorporated entirely in the hinge, whilst achieving a hinge with a small volume, particularly when made of metal. More particularly, this hinge does not call for the end of the lug or arm to be extra thick.

According to a first embodiment, the two knuckles are male with a single contacting face perpendicular to the hinge pin, at least one of which has a radial raised portion with an oblique side which can lodge in one or more radial recesses in the other, it being possible for these knuckles to move apart from each other along the connecting hinge pin against the force exerted by a coaxial spring.

This embodiment with a double male knuckle makes it possible to produce hinges which are particularly effective while having a small volume.

Advantageously then, the raised portion is diametral and the recess is cruciform, so as to define the two open and closed positions of the arm.

Such a cruciform recess is easily produced by two grooves at right angles made by milling, both passing through the centre of the knuckle. The recess may have a regular or asymmetric cruciform shape, namely consisting of two grooves having different depths and/or widths which then involve a resilience which is particular to each of the two positions.

The same is the case for a diametral raised portion made in one piece by milling. This raised portion, cut in the mass of the knuckle, may have a triangular cross-section if it is desired to optimize the resilient effect, or a rounded semi-cylindrical section if it is desired to reduce the frictional forces.

In the case of a moulded part made of plastic or metal, it is possible to consider the construction of a regular cruciform raised portion complementary to the recess. Although somewhat more difficult to achieve, such a raised portion has the advantage of an increased oblique contact surface.

As an alternative, the knuckle carrying the raised portion may be in the form of a cup of which the cylindrical lateral wall has two diametral orifices, and the raised portion then consists of a pin passing through the orifices of the knuckle and through a hole transverse to the hinge pin which is thus fixed to the knuckle.

Preferably then, the resilient device is a spring inserted between the head of the hinge pin and the outer face of a first knuckle, the other end of the hinge pin being fixed to the other knuckle, for example by a threaded portion fitting into a tapped orifice, or by an orthogonal pin passing simultaneously through the hinge pin and the other knuckle.

Advantageously, the head of the hinge pin and the spring are contained in a housing cup provided in the external face of the first knuckle. This cup is relatively simple to produce by simple drilling and enables the spring and the hinge pin to be protected.

The spring may be helical and wound coaxially about the hinge pin. The resilient hinge will then be straighter and higher.

In order to increase the stiffness of the resilience while reducing the travel, it is possible to use a helical spring closed on itself in the manner of a torus coaxial to the hinge pin.

As an alternative, it is possible to use a helical spring coaxial with the axis, but of which the diameter of each turn increases so as to form a conical spring. The travel of such a spring is large on account of the fact that it may be compressed until its height is reduced to the thickness of one turn, the spring then forming an ellipse. The resilient hinge will then be wider in the horizontal plane and thin.

According to the desired aesthetic considerations, the lug and the arm can be arranged in the extension of the diameter of the hinge, or offset in relation to each other in the horizontal plane, one close to the temple of the wearer and the other towards the outside.

One or both of the contacting faces of the knuckles are usefully covered by a washer matching the shape of the raised portion or the corresponding recess, this washer being made of a material having a greater hardness and/or lower friction than the material constituting the knuckles.

According to a second embodiment, the female knuckle is in the form of a bush of which the cylindrical lateral wall has a V shaped slit forming two upper hollows, and the male knuckle is in the form of a rod end having a circular cross-section constituting, in relation to the slit, a semi-circular raised portion, this rod end being fixed to a disc acting as a connecting pin and sliding in the bush, a resilient device acting between the bottom of the bush and the disc.

Each of the V-shaped hollows defines one of the two open or closed positions of the hinge. This embodiment also includes parts which are simple to machine and enables an unobtrusive hinge to be obtained which is directly adaptable to the ends of the lug or a thin arm, it being possible for the arm to be reduced to a simple metal rod.

Advantageously, the hollow defining the open position of the arm is extended by a small section which also slopes downwards, permitting a resilient movement of the arm beyond its open position.

The invention will be better understood from a study of embodiments which are in no way limiting and described by the following figures in which

DETAILED DESCRIPTION OF THE INVENTION

Figure 1:
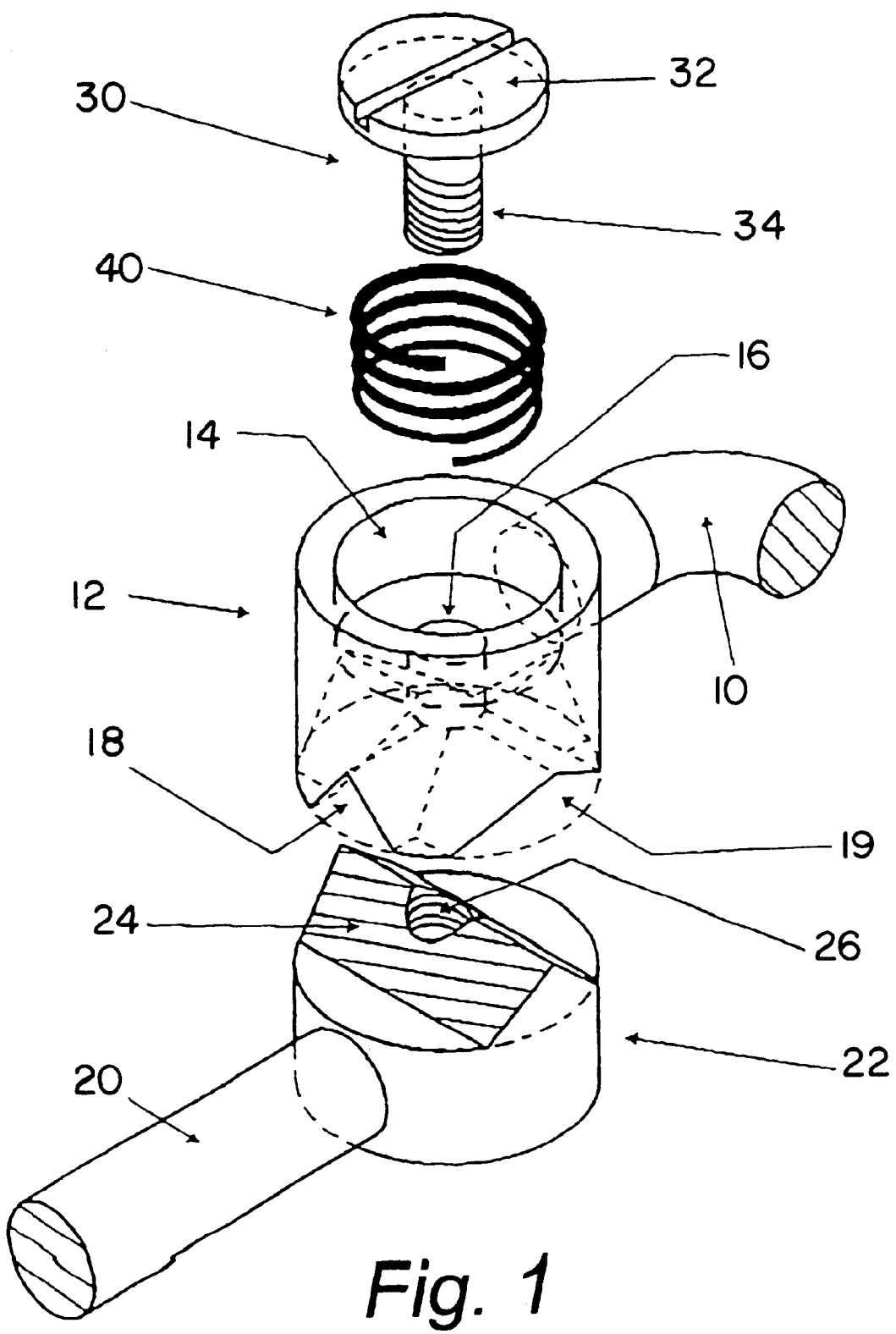
FIG. 1 is an exploded perspective view of a first embodiment of a hinge according to the invention, FIG. 2(*a,b*) are respectively views of the hinge of FIG. 1 from the side and above with the arm in the open position, FIG. 3(*a,b*) are similar views to FIGS. 2, but with the arm in an intermediate position.
Figure 2A:
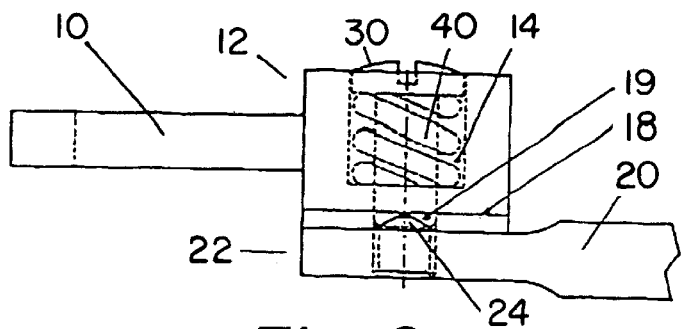
Figure 2B:
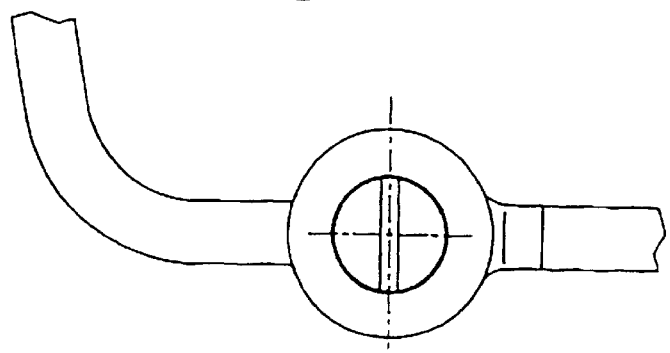

FIGS. 1, 2(*a,b*) and 3(*a,b*) show a hinge comprising on the one hand a front knuckle 12 fixed to a front lug 10 attached to the side of the front of a spectacle frame; and on the other hand an arm knuckle 22 fixed to the end of an arm 20 of which the other end is curved in order to hook behind the ear. These two knuckles 11 and 22 are connected by a swivel pin, in the event a screw 30 of which the head 32 comes opposite the upper face of the front knuckle 12, and of which the threaded rod 34 passes through the eyehole 16 of this same knuckle 12 to enter a central tapped orifice 26 of the arm knuckle 22 in which this screw is immobilized, for example, by driving the threaded portion into the tapping. Other known devices for holding the screw 30 in the hinge, for example by means of a transverse pin, are also applicable.

More particularly, according to the invention, the screw 30 is higher than necessary so that a resilient supporting device 40 can be inserted between the head 32 of the screw and the upper face of the front knuckle 12. As shown in FIGS. 1, 2(*a,b*) and 3(*a,b*), this resilient device is a helical spring coaxial with the screw 30 situated in a housing cup 14 made by drilling the upper face of the front knuckle 12, this cup being closed by the head 32. By virtue of this arrangement, the front knuckle 12 is able to move away from the arm knuckle 22 in translation along this rod 34, and against the compression of the spring 40.

In addition, the upper surface of the arm knuckle 22, in contact with the lower surface of the front knuckle 12, has a raised portion 24 which is here diametral with a triangular cross-section. Correspondingly, two perpendicular diametral recesses 18 and 19 are produced in the lower face of the front knuckle 12. In the event, these two recesses also have a triangular cross-section, one 18 of substantially identical size to the cross-section of the raised portion 24, and the other 19 having a wider base.

FIG. 2(*a,b*) show the hinge when the arm 20 is in the open position, i.e. in the extension of the front lug 10. In this position, the diametral raised portion 24 of the arm knuckle 22 falls inside the recess 19. The upper surface of the arm knuckle 22 and the lower surface of the front knuckle 12 are then in contact by the action of the spring 40 pressing under the head 32 of the screw 30 and pushing this knuckle 12 downwards.

Figure 3A:
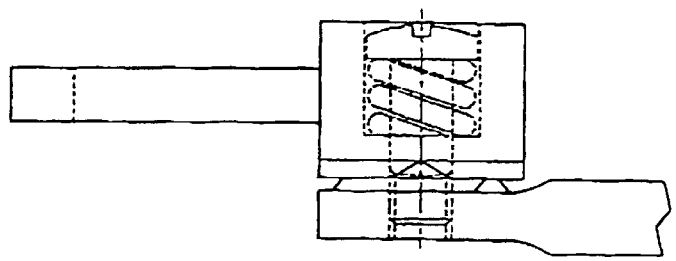
Figure 3B:
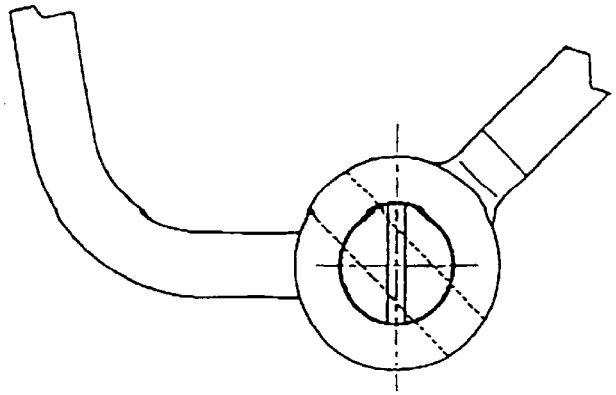

FIG. 3(*a,b*) show how a rotation imparted to the arm 20 in relation to the lug 10, in-particular during a movement from the open position to the closed position, causes the raised portion 24 to leave the recess 19 producing a downwards translational movement of the knuckle 22 and the screw 30 against the compression of the spring. On the other hand, as soon as the raised portion 24 begins to engage in the other recess 18, compression of the spring 40 encourages this raised portion to rise into this second recess, which accelerates the arrival of the arm into its second position. This downward and then upward translational movement of the arm knuckle 22 in relation to the front knuckle 12 is in particular possible through the interaction of the corresponding oblique walls of the raised portion 24 and the recess 18 or 19.

Figure 4:
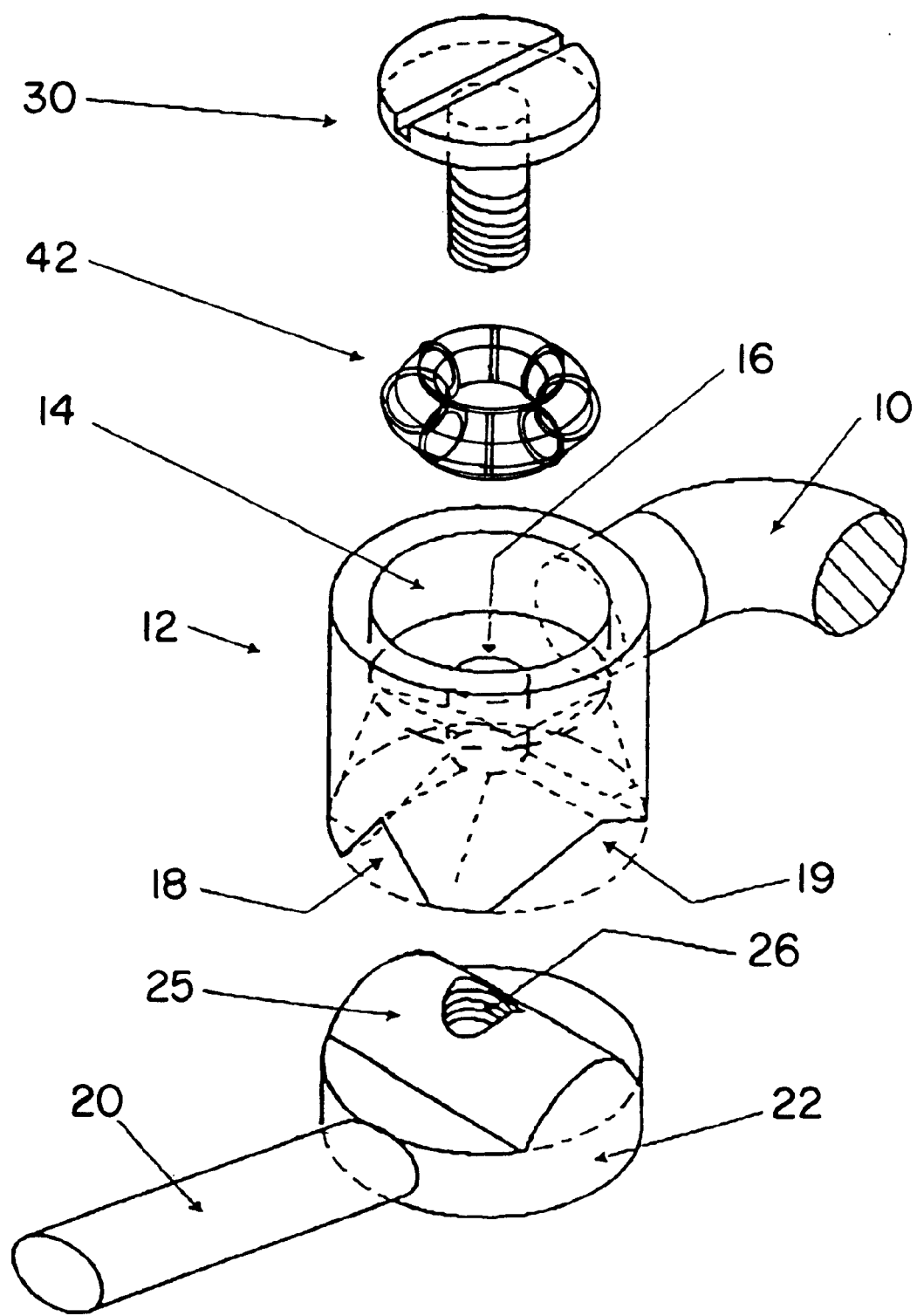
FIG. 4 is an exploded perspective view of a first alternative embodiment of the hinge according to FIG. 1, FIG. 5(*a–d*) are respectively views from the side and above of the hinge of FIG. 4, firstly with the arm in the open position and then with the arm in an intermediate position, FIG. 6(*a–b*) are longitudinal sectional views from the front and side respectively of a second variant of the hinge according to FIG. 1.
Figure 5A:
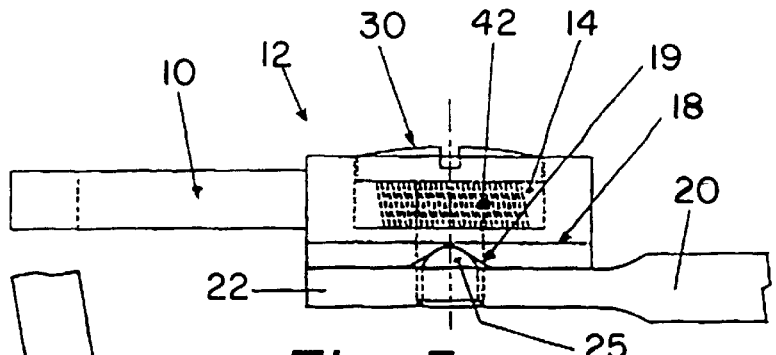
Figure 5B:
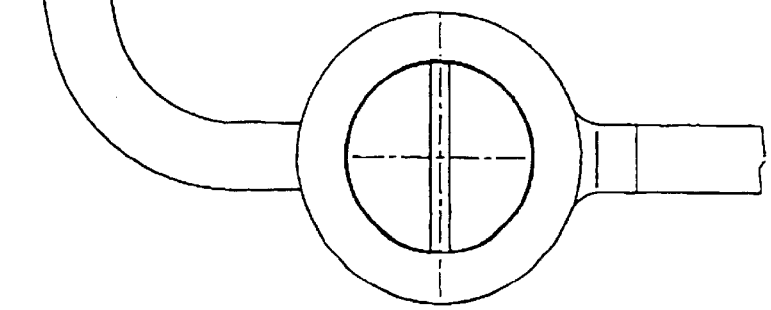
Figure 5C:
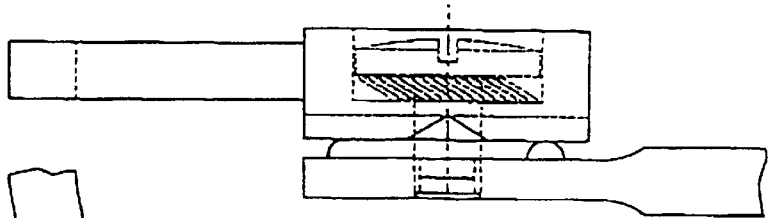
Figure 5D:
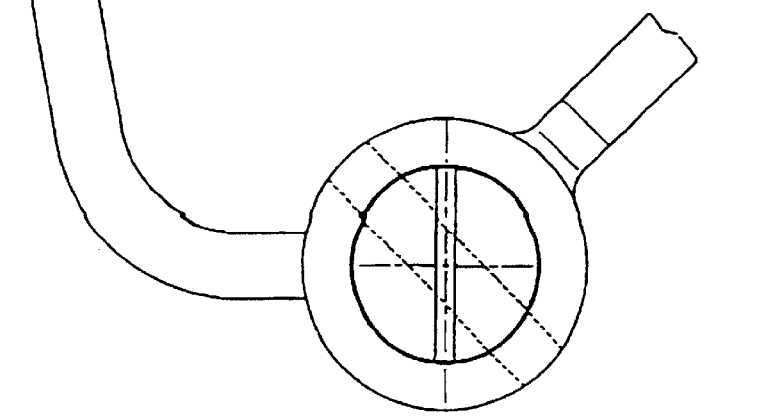

FIGS. 4 and 5(*a–d*) show a first alternative embodiment in which the raised portion 25 of the arm knuckle 22 has a rounded cross-section. In other words, this raised portion 25 is in the form of a semicylinder cut along a diametral middle plane. The vertical travel of the arm knuckle in relation to the front knuckle is slightly reduced, but the interaction between the raised portion and the corresponding recess is more flexible.

In this alternative embodiment, the resilient device is in the form of a helical spring 42 closed on itself in the form of a torus, wound about the axis of the screw 30. As shown in FIGS. 5(*a–d*), when the raised portion 25 leaves the recess 18 or 19, this spring 42 is compressed in the form of a lateral crushing of each of the turns. Such a spring has the advantage of having a high elastic coefficient, which enables sufficient thrust to be exerted even after a small travel in compression.

As is more clearly visible in FIG. 5(*a–d*), this hinge may then be in a flatter form having a slightly larger diameter than the first embodiment of FIG. 1, thus providing an alternative to the stylist when designing the general aesthetics of the spectacle frame. In FIG. 5*b*, the arm in the open position is shown aligned with the diameter of the hinge and also in the extension of the lug 10. However, in this embodiment of a hinge with a large diameter, it is perfectly possible to envisage the lug and the arm being offset in relation to each other in a plane for aesthetic considerations, either the lug or the arm then being closer to the temple of the wearer.

Figure 6A:
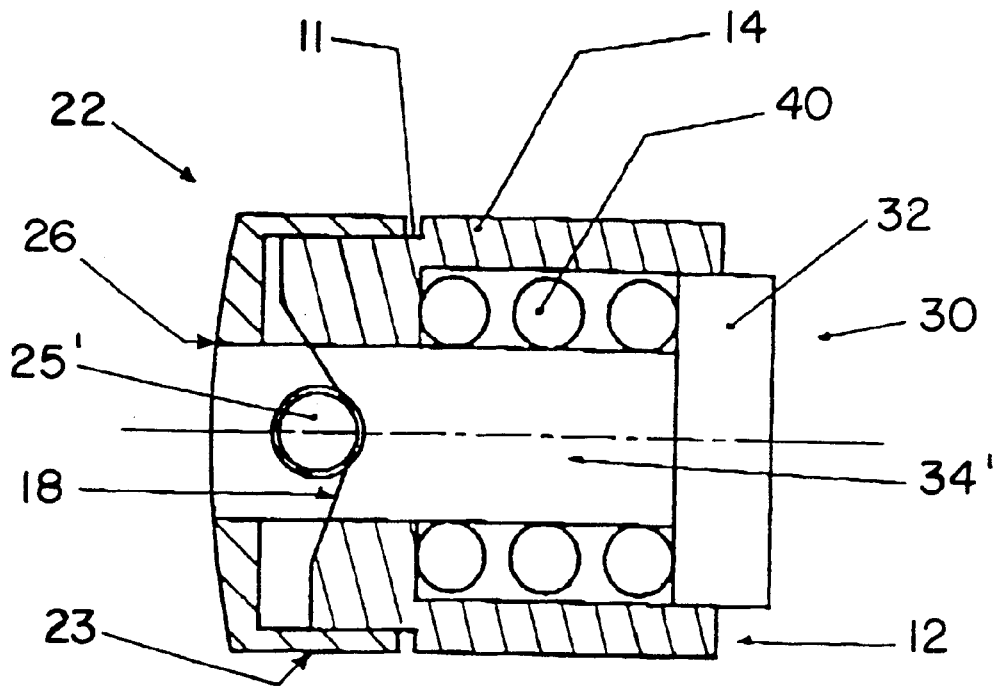
Figure 6B:
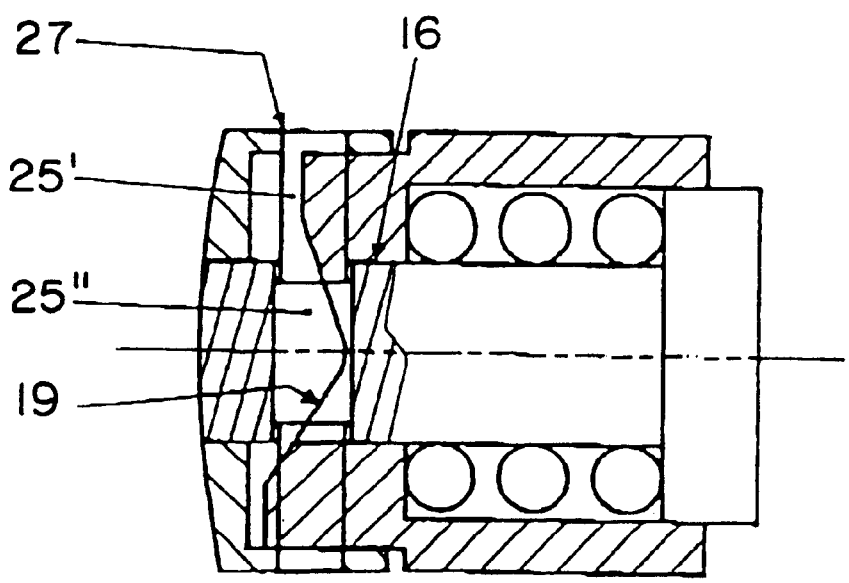

A second variant, shown in FIG. 6(*a,b*), differs from the example of FIG. 1 mainly in the method of construction of the knuckle 22 bearing the raised portion, and similar parts are designated by identical references. In this variant, the knuckle 22 is based on a cup having a base through which is drilled a central orifice 26 and is bordered by a cylindrical side wall 23. Two diametral orifices 27 are provided in this wall. Correspondingly, the connecting pin 30 has a head 32, and its rod 34' has a transverse orifice instead of a thread. The raised portion then consists simply of a pin 25' passing simultaneously through the wall 23 and the rod 34', thus locking the hinge pin.

When mounted, the side wall 23 of the knuckle 22 surrounds the knuckle 12 and the end of the rod 34' is housed in the orifice 26 to provide additional guiding. If desired, a cylindrical step 11 is provided in the lower part of the hinge 12, said step receiving the wall 23 to preserve a constant external diameter of the knuckle.

The semicylindrical upper portion of the pin 25 then interacts, as in the preceding examples, with the perpendicular diametral recesses 18 and 19 under the force exerted by the spring 40 to define the two rest positions of the arm. This pin may have a projecting central part 25' forming two shoulders which are held in the central eyehole 16 of the knuckle 12. This shoulder enables this pin to be locked in place, while retaining the possibility of disassembly.

Figure 7:
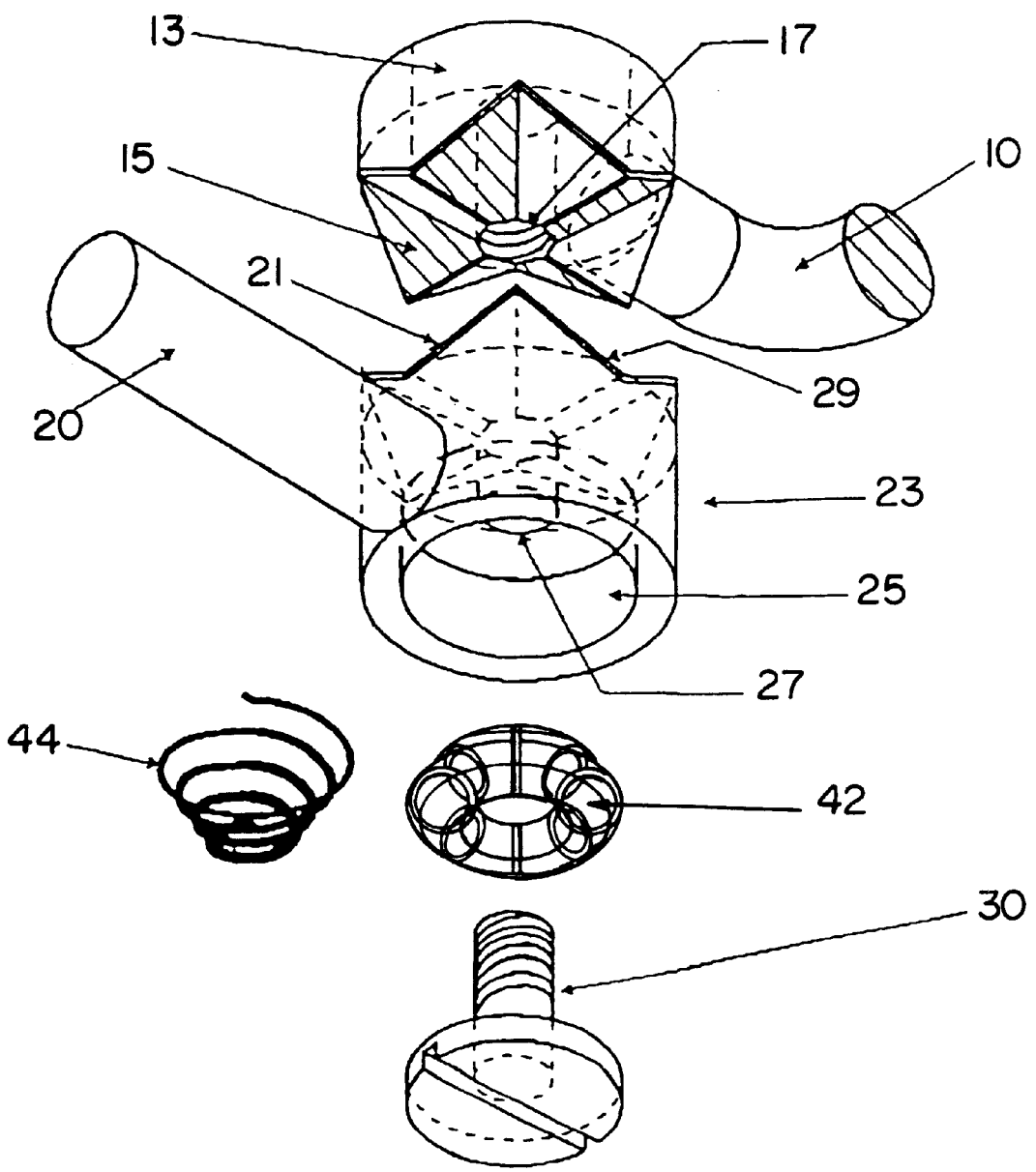
FIG. 7 is an exploded perspective view of a third alternative embodiment of a hinge according to FIG. 1.

An inverted third alternative embodiment is shown in FIG. 7 in which it is the knuckle 13 which has a raised portion 15 and a threaded orifice 17, whereas the arm knuckle 23 has a recess 29 on its upper surface complementary to the raised portion 15, and a housing cup 25 in its upper face opening into a central eyehole 27 for the passage of a screw 30, this time fitted from below.

This variant also shows how the raised portion 15 and the recess 29 may both have complementary regular cruciform shapes. In other words, this raised portion corresponds to the interpenetration at right angles of two triangular diametral raised portions 24. This geometry, which is certainly complex, and which is produced by moulding, slightly increases the oblique areas of interaction between the raised portion 15 and the recess 29.

The triangular cross-section of the raised portion 15 and of the recess 29 may also be rounded to then form a front gearing with two sets of four teeth, the cylindrical wall of the orifice 17 and of the eyehole 27 then being ribbed by the undulations of these gear teeth.

This example of FIG. 7 shows how the contacting surfaces of the front and arm knuckles may be respectively covered by a washer 21 exactly matching the shape of the raised portion and the recess. This washer is made of a material such as stainless steel having a greater hardness and a lower friction than the plastic used for moulding a hinge according to FIG. 7 or than the nickel silver alloy in which the hinges illustrated in FIGS. 1, 2(*a,b*), 3(*a,b*), 4, 5(*a–d*) and 6(*a,b*) are milled.

In this example, a third type of spring is also shown which can be used inside a hinge according to the invention : in the event a conical helical spring 44, namely one of which the diameter of each turn is greater than that of the preceding one. When completely compressed, such a spring then takes the shape of an ellipse which enables it to have a longer travel than a traditional helical spring.

Figure 8:
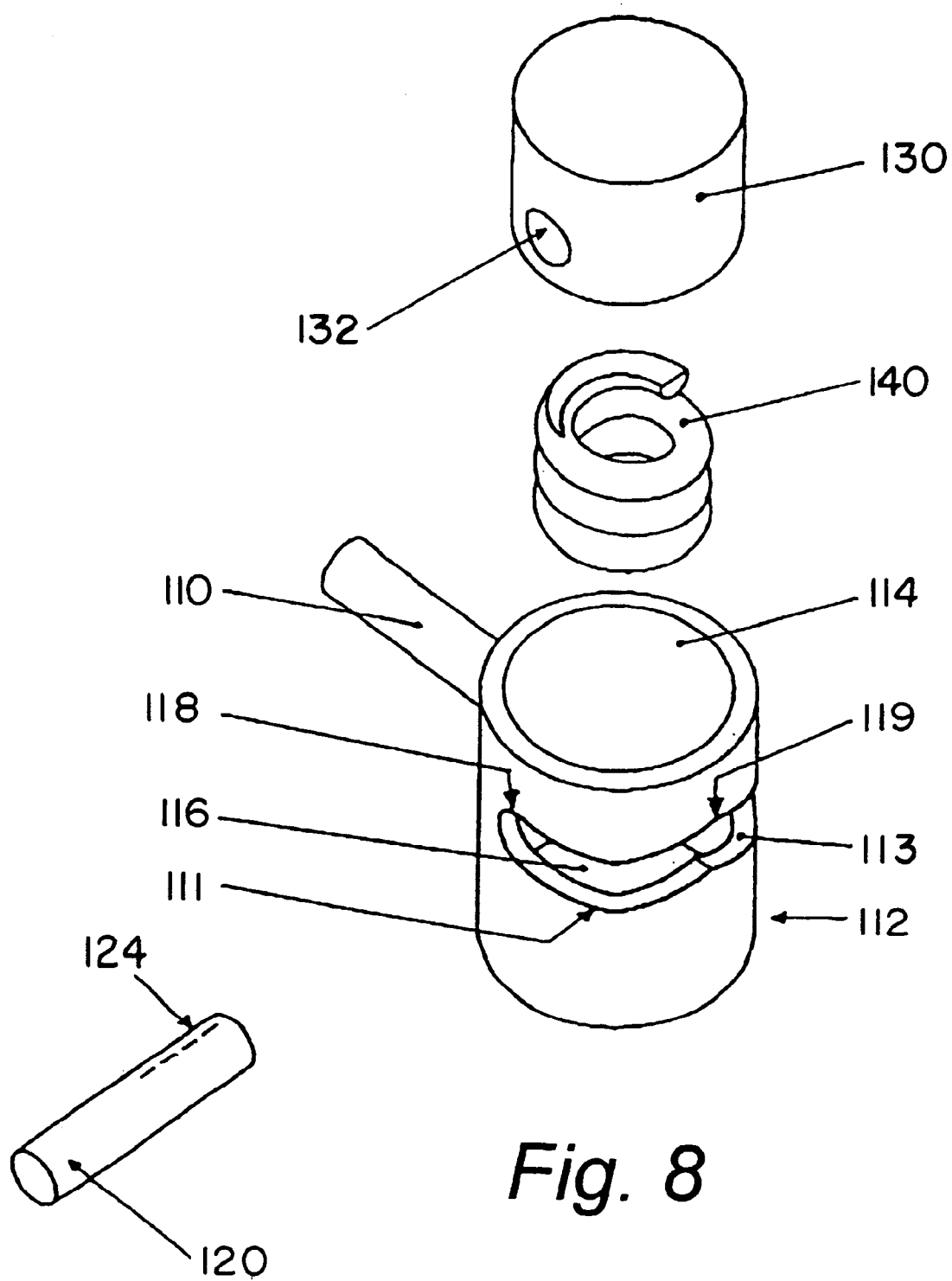
FIG. 8 is an exploded perspective view of a second embodiment of a hinge according to the invention, and FIG. 9(*a–d*) are perspective views of the hinge according to FIG. 8 once assembled and, respectively, when the arm is in a closed position, an intermediate position, an open position and a position beyond its open position.

A second embodiment of a hinge according to the invention is shown in FIGS. 8 and 9(a–d) comprising a male knuckle 124/130 constructed at the end of an arm 120 and associated with a female knuckle 112 fixed to a lug 110, it being understood that the arm and the lug may be inverted.

More particularly, the knuckle 112 is in the form of a bush having a bottom 116 and a cylindrical wall 114. A transverse V-shaped slit 111 is provided in this wall defining, in the direction of the upper open edge, two hollows: a left hand one 118 and a right hand one 119. This slit extends beyond the hollow 119 in a downwards sloping slit 119.

Correspondingly, the male knuckle is reduced to a rod end 124 with a circular cross-section directly engaged in the female knuckle, i.e. in the slit 111 constituting the interstice between the eyeholes, so as to be fixed in an orifice 132 provided in the periphery of a disc 130 constituting the connecting hinge pin. A compression spring 140 rests on the one hand against the bottom 116 of the bush and on the other hand against the lower face of the disc 130 which can slide inside the bush. The upper semicylindrical part of the end 124 of the rod thus constitutes a raised portion with a rounded oblique side interacting in a flexible manner with the upper contact surface of the slit 111/113.

Figure 9A:
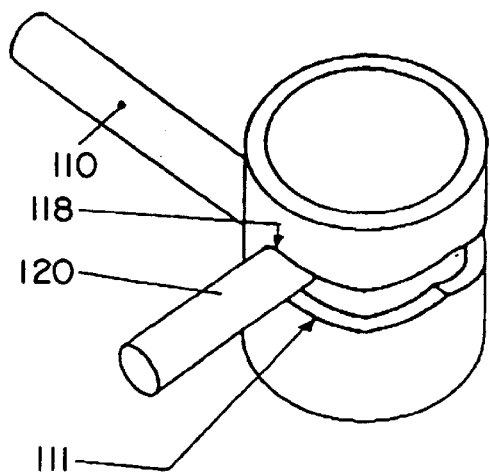
Figure 9B:
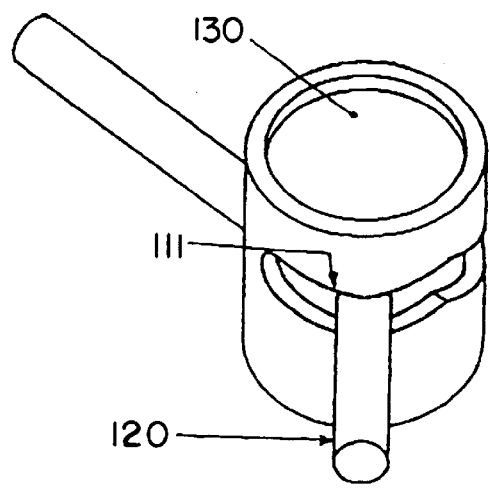
Figure 9C:
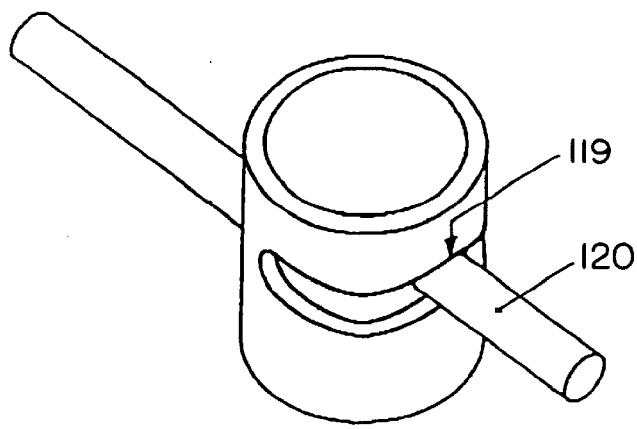
Figure 9D:
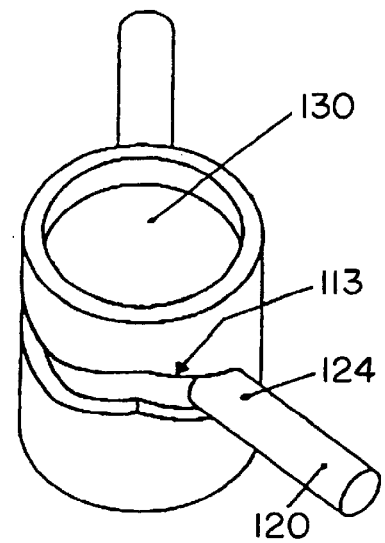

As shown in FIG. 9a, the hollow 118 of the V-shaped slit 111 defines the closed position of the arm 120 in relation to the lug 110 fixed to the front of the spectacle frame. FIG. 9b shows how, when the arm 120 is moved in rotation, interaction between the slit 111 and the rod end 124 imparts a downwards translational movement to the male knuckle, in the event the disc 130 towards the bottom of the bush, this being against the compression of the internal spring. FIG. 9c shows how the arm 120 then rises under the impulse given by the internal spring in the second hollow 119 defining the open position. If the arm is pushed beyond its open position, the end 124 then passes into the downwards sloping extension 113, which once again lowers the disc 130 against the internal spring, as will be seen more clearly in FIG. 9d.

Many improvements may be made to this spectacle frame with a resilient hinge within the scope of the claims.

We claim:

1. A resilient hinge comprising a front knuckle fixed to a front lug and an arm knuckle fixed to an arm, the two knuckles being connected by a hinge pin and having two contacting faces perpendicular to the hinge pin, wherein the contacting face of one of the two knuckles has at least one raised portion with an oblique side interacting with one or more recessed portions of the contacting face of the other knuckle, and wherein the knuckles can move in relation to each other along the connecting hinge pin against the force exerted by a resilient device coaxial with the hinge pin when the raised portion leaves the recessed portions in the event of the arm rotating with respect to the front lug.

2. A resilient hinge according to claim 1, wherein the two knuckles are male with a single contacting face perpendicular to the hinge pin, at least one of which has a radial raised portion with an oblique side which can lodge in one or more radial recesses in the other.

3. A resilient hinge according to claim 2, wherein the raised portion is diametral and the recesses is cruciform, symmetrically or asymmetrically, so as to define the two open and closed positions of the arm.

4. A resilient hinge according to claim 3, wherein the cross-section of the raised portion is triangular or semicylindrical.

5. A resilient hinge according to claim 3, wherein the resilient device comprises a spring inserted between the head of the hinge pin and the outer face of the corresponding knuckle, the other end of the hinge pin being fixed to the other knuckle.

6. A resilient hinge according to claim 3, wherein at least one of the two contacting faces of the knuckles are covered by a washer matching the shape selected from the group consisting of the raised portion and the corresponding recess, said washer being made of a material which is harder and has a lower friction than the material constituting the knuckles.

7. A resilient hinge according to claim 2, wherein the recess and the raised portion both have regular complementary cruciform shapes.

8. A resilient hinge according to claim 7, wherein the cross-section of the raised portion is triangular or semicylindrical.

9. A resilient hinge according to claim 7, wherein the resilient device comprises a spring inserted between the head of the hinge pin and the outer face of the corresponding knuckle, the other end of the hinge pin being fixed to the other knuckle.

10. A resilient hinge according to claim 7, wherein at least one of the two contacting faces of the knuckles are covered by a washer matching the shape selected from the group consisting of the raised portion and the corresponding recess, said washer being made of a material which is harder and has a lower friction than the material constituting the knuckles.

11. A resilient hinge according to claim 2, wherein the cross-section of the raised portion is triangular or semicylindrical.

12. A resilient hinge according to claim 11, wherein the resilient device comprises a spring inserted between the head of the hinge pin and the outer face of the corresponding knuckle, the other end of the hinge pin being fixed to the other knuckle.

13. A resilient hinge according to claim 11, wherein at least one of the two contacting faces of the knuckles are covered by a washer matching the shape selected from the group consisting of the raised portion and the corresponding recess, said washer being made of a material which is harder and has a lower friction than the material constituting the knuckles.

14. A resilient hinge according to claim 2, wherein the knuckle having the raised portion is in the form of a cup of which the cylindrical lateral wall has two diametral orifices, and wherein the raised portion comprises a pin passing through the orifices in the knuckle and through a transverse hole in the hinge pin.

15. A resilient hinge according to claim 14, wherein the resilient device comprises a spring inserted between the head of the hinge pin and the outer face of the corresponding knuckle, the other end of the hinge pin being fixed to the other knuckle.

16. A resilient hinge according to claim 2, wherein the resilient device comprises a spring inserted between the head of the hinge pin and the outer face of the corresponding knuckle, the other end of the hinge pin being fixed to the other knuckle.

17. A resilient hinge according to claim 16, wherein the head of the hinge pin and the spring are contained in a housing cup provided in the outer face of the knuckle.

18. A resilient hinge according to claim 17, wherein the spring is in a form selected from the group consisting of a helix, closed on itself in the manner of a torus coaxial with the hinge pin, and a conical helix.

19. A resilient hinge according to claim 2, wherein at least one of the two contacting faces of the knuckles are covered by a washer matching the shape selected from the group consisting of the raised portion and the corresponding recess, said washer being made of a material which is harder and has a lower friction than the material constituting the knuckles.

20. A resilient hinge according to claim 1, wherein one knuckle is in the form of a bush of which the cylindrical lateral wall has a V-shaped slit forming two upper hollows, and wherein the other knuckle is in the form of a rod end with a circular cross-section, fixed to a disc acting as a connecting pin and sliding in the bush, a resilient device acting between the bottom of the bush and the disc.

* * * * *